United States Patent [19]

Tabel

[11] 4,186,668
[45] Feb. 5, 1980

[54] SYSTEM FOR THE PYROLYTIC COMBUSTION OF LIGNEOUS AND OTHER WASTES

[76] Inventor: Rene Tabel, Laroquebrou, Cantal, France

[21] Appl. No.: 872,503

[22] Filed: Jan. 26, 1978

[30] Foreign Application Priority Data

Jan. 26, 1977 [FR] France ................................ 77 03550
May 17, 1977 [FR] France ................................ 77 15823
Oct. 13, 1977 [FR] France ................................ 77 31393

[51] Int. Cl.² ............................................. F23G 5/12
[52] U.S. Cl. .................... 110/213; 110/222; 110/224; 110/251; 110/246
[58] Field of Search ............... 110/212, 213, 224, 222, 110/251, 255, 246

[56] References Cited

U.S. PATENT DOCUMENTS

| | | | |
|---|---|---|---|
| 3,203,377 | 8/1965 | Claassen et al. | 110/251 |
| 3,408,968 | 11/1968 | Pantoja | 110/251 |
| 3,848,550 | 11/1974 | Bowen | 110/224 |
| 3,938,449 | 2/1976 | Frisz et al. | 110/222 |
| 3,961,587 | 6/1976 | Ozawa | 110/251 |
| 4,009,667 | 3/1977 | Tyer et al. | 110/255 |

*Primary Examiner*—Kenneth W. Sprague
*Attorney, Agent, or Firm*—Michael Ebert

[57] ABSTRACT

A system for the combustion of moist ligneous and other wastes, such as sawdust and compacted household rubbish in order to generate heat. The system includes a crusher-extractor to divide the waste matter entrained in an air stream to produce a fuel mixture that is fed into one input of an exchanger-separator whose output supplies a pyrolytic burner coupled to a boiler. The hot fumes from the boiler are fed back into the other input of the exchanger-separator which serves to mix fresh divided waste with residue or unburned waste extracted from the fumes, and to separate the waste material to be consumed in the burner from the hot gas and moisture.

18 Claims, 15 Drawing Figures

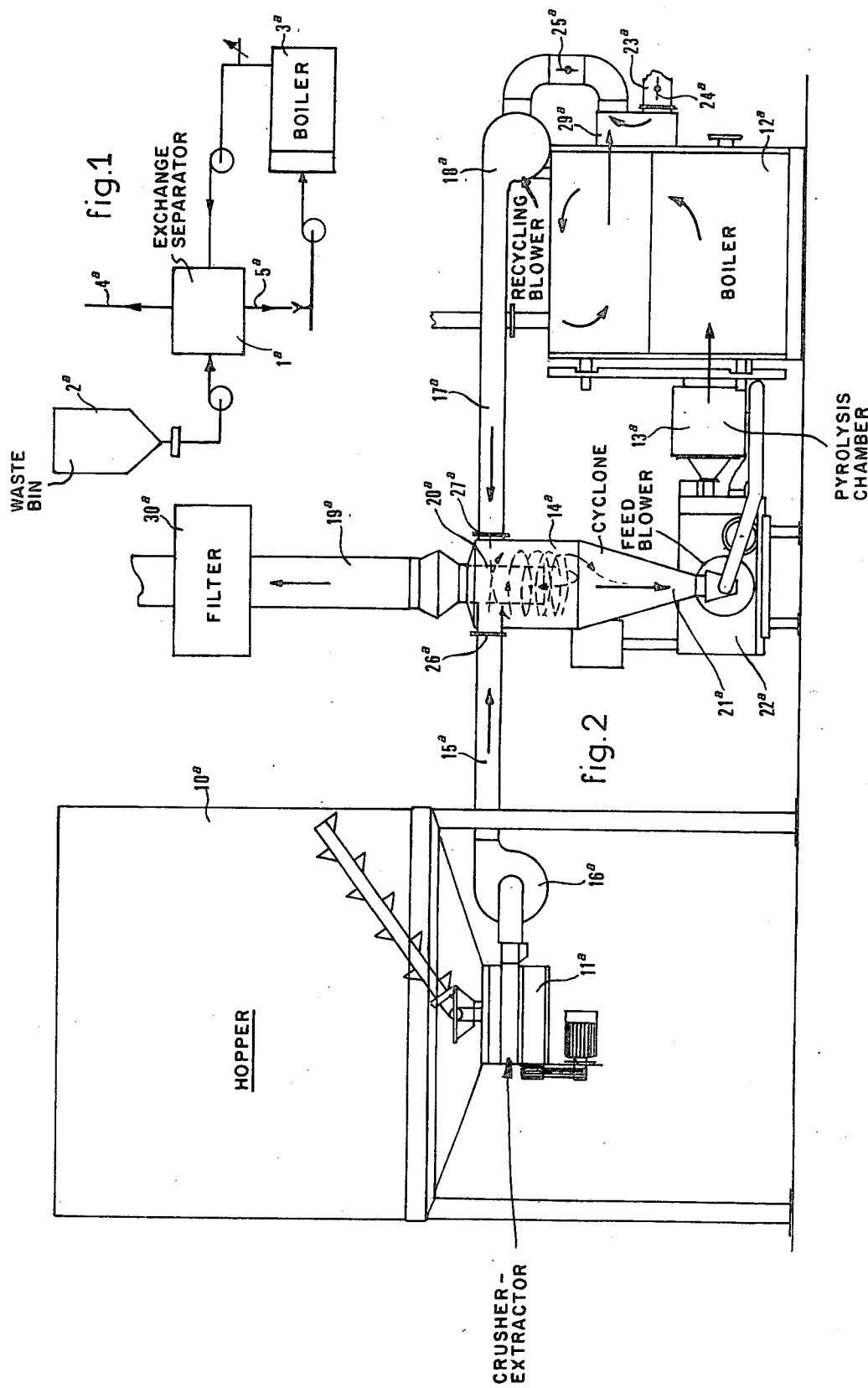

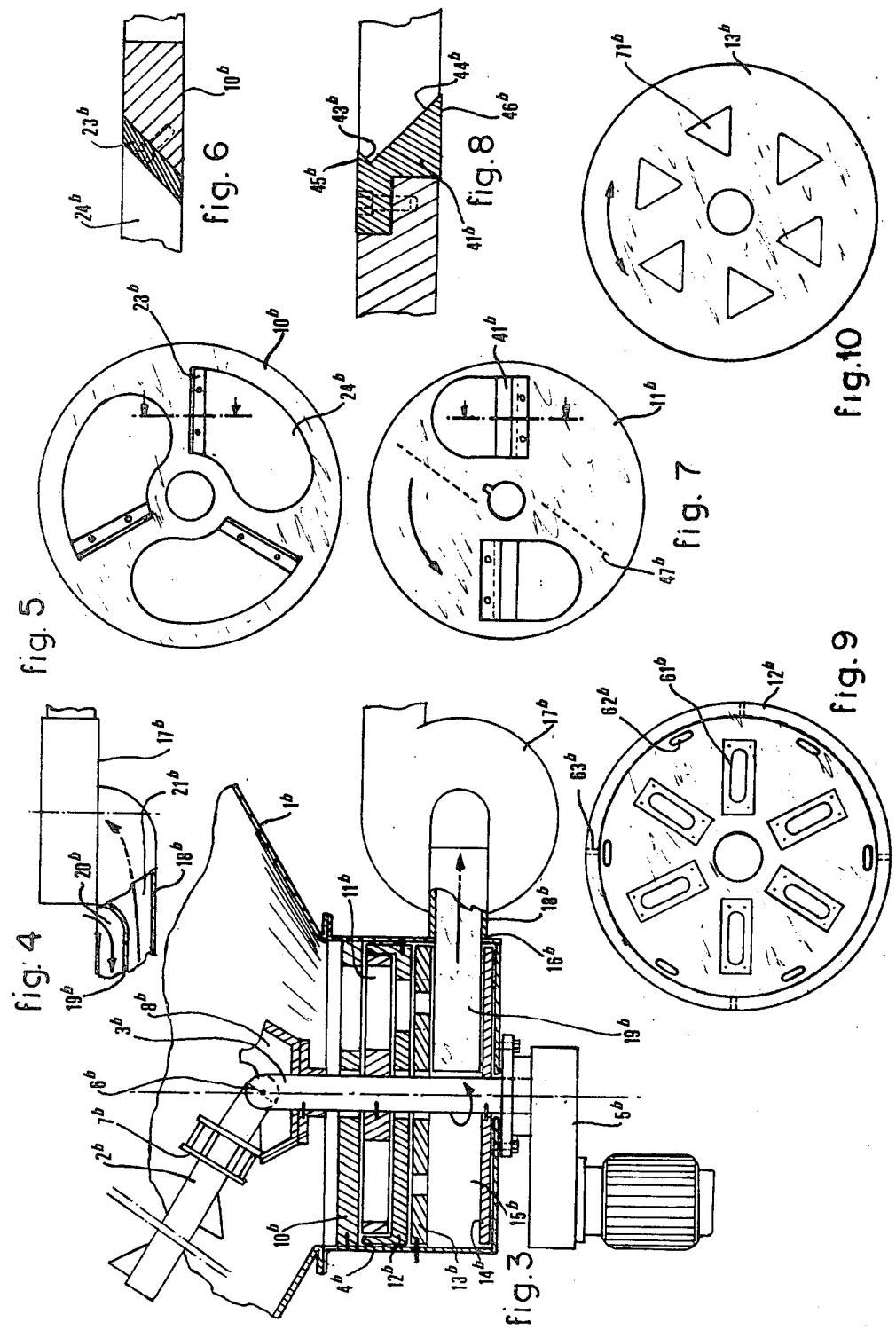

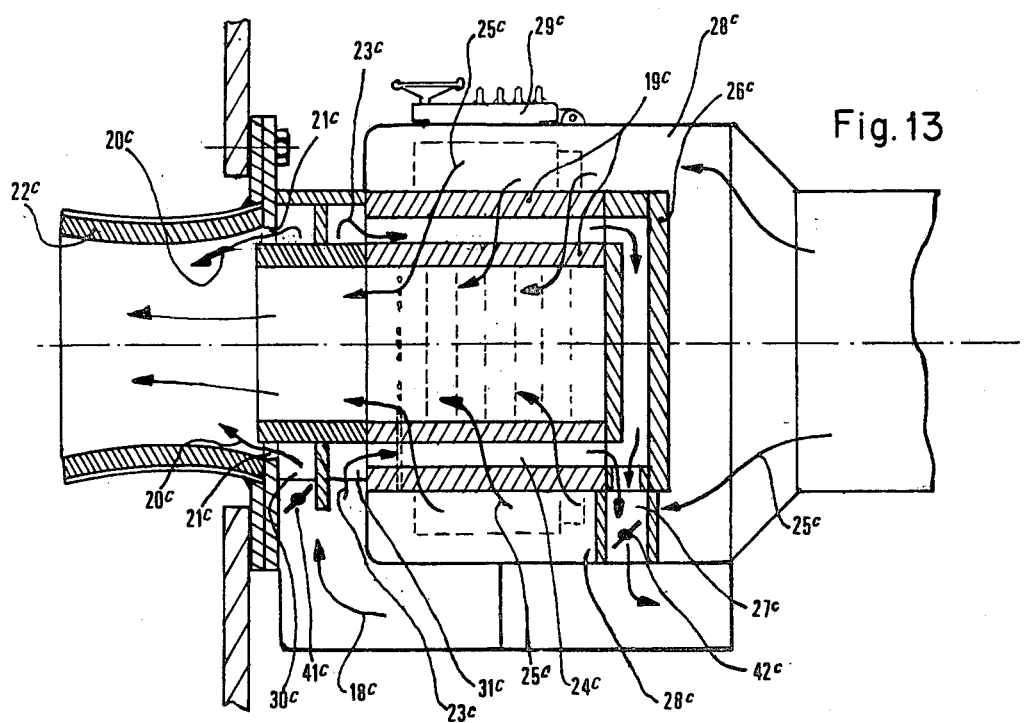
Fig. 13
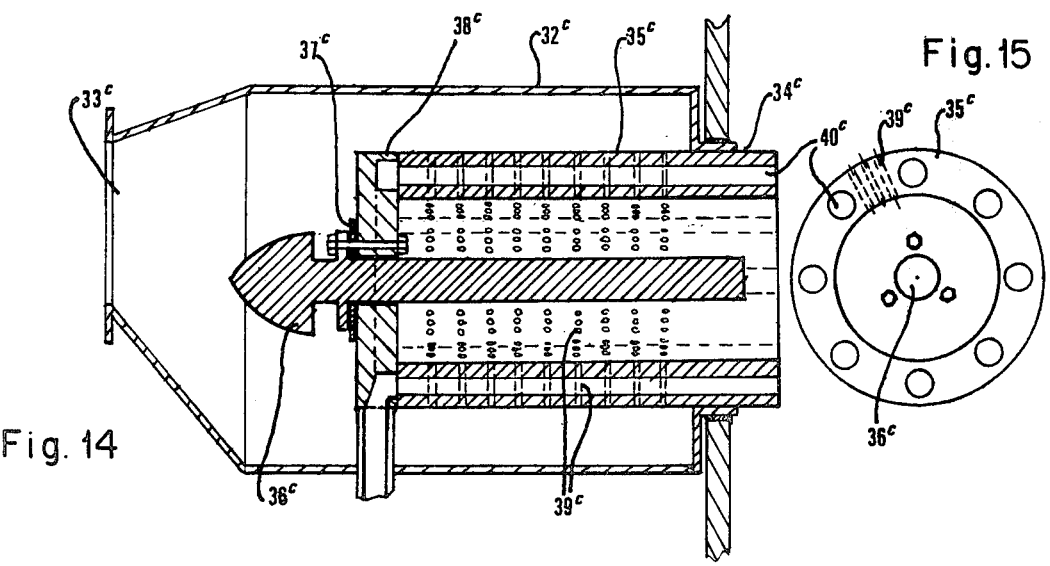
Fig. 14
Fig. 15

SYSTEM FOR THE PYROLYTIC COMBUSTION OF LIGNEOUS AND OTHER WASTES

BACKGROUND OF INVENTION

The present invention relates generally to the production of heat or energy, and more particularly to a technique and to a system for carrying out the technique which exploits ligneous or other wastes, such as wooden chips, sawdust or compacted household rubbish in order, for instance, to heat boilers producing hot water or steam.

The high price of fossil fuels such as coal and petroleum has in recent years stimulated research directed to the combustion of various industrial or agricultural wastes for heating purposes. Thus processes are known for producing heat by the combustion of ligneous wastes such as sawdust and other wood-cutting residues. These prior methods usually involve the removal of the wastes to be burned from a bin and their division or disintegration by crushing. The crushed waste material is then entrained in a stream of air and is directly injected into the mouth of a boiler where the wastes are ignited more or less spontaneously under the action of the heat radiated in the firebox.

In practice, however, the ignition of the waste injected in this manner is not entirely spontaneous, and the combustion is therefore frequently incomplete. It is for this reason that such prior processes also include the simultaneous injection of a more inflammable fuel such as petroleum or gas, the ligneous waste then serving as an auxiliary fuel. Hence prior techniques that dictate the use of costly and scarce fossil fuels as well as waste matter are inefficient in economic terms.

SUMMARY OF INVENTION

Accordingly, it is the main object of the present invention to burn ligneous wastes completely without the addition of other fuel. A salient feature of the invention resides in a system in which some of the heat of combustion from the hot zone of the firebox is withdrawn therefrom and conducted into a colder region where air and waste material are present, the heat causing pyrolysis of this material.

Another object of the invention is to avoid the drawbacks arising from marked variations in the moisture content of the ligneous wastes intended to be burned in the above-noted manner while realizing an improvement in the thermal efficiency of the combustion of these wastes, a system being provided wherein the heat of the fumes furnishes the energy necessary for a prior drying of the waste and wherein a "cyclone" affords the means to bring about this exchange, while separating the wet gases from the dried waste.

Still another object of the invention is to provide a uniform, controlled production of divided ligneous waste even when the ligneous waste is very wet.

Briefly stated, these objects are attained in a system in accordance with the invention for burning relatively moist ligneous wastes such as chips, sawdust, etc. in a boiler firebox, from which they are then removed in the form of a hot mixture or so-called "fumes" constituted by gas and by solid particles, some of which consist of incompletely burned ligneous waste, referred to as "residue."

An "exchanger-separator" is provided into which is fed both the ligneous waste and the fumes in a manner whereby the ligneous waste is mixed intimately therein with the fumes, the solid particles, fresh waste and residue being separated from the gaseous phase. Hot gases laden with moisture are removed from the exchanger-separator as well as the ligneous waste and the residue. Because of this operation, the ligneous waste is subjected to a certain degree of drying and a certain degree of heating, as a consequence of which a large proportion of the residue can be recycled to the boiler firebox.

It is to be noted that the exchange and separating functions assigned to the enclosure of the "exchanger-separator" can be carried out either simultaneously or consecutively. That is to say, the exchange function can be carried out either by transfer through a wall or by direct contact or mixing, and that the separating function can be effected either by steric selection (screening, filtration) or by weight selection (settling, centrifuging).

More particularly, the waste is introduced into the exchanger-separator entrained in a stream of air. A turbulent movement is created therein having the effect of intimately mixing the fumes and the stream of air entraining the ligneous waste and of concurrently effecting the separation of the gaseous phase from the solid particles. The means of creating such turbulent movement may be static in nature, such as the specific geometry of the enclosure and the specific arrangement of the inlets for the streams of gas, or may be dynamic in nature as by means of a blade agitator.

In a preferred embodiment, the exchanger-separator has the cylindrical-conical geometry of a "cyclone" and includes two axial outlets, one being a lower outlet and the other an upper outlet. Two upper tangential inlets are provided, one inlet being supplied by a so-called extraction blower, it being understood by this term that it is directly connected with a "crusher-extractor" that feeds into the cyclone the stream of air entraining the waste. The other inlet is supplied by a so-called recycling blower which feeds the fumes into the cyclone so as to recycle the residues therein. The upper outlet of the cyclone is connected with a chimney to exhaust into the atmosphere the moisture-laden gases, whereas the lower outlet of the cyclone functions as a delivery spout for the solid particles, ligneous waste, and residue.

In accordance with one preferred embodiment of a system in accordance with the invention, the extraction blower is supplied with crushed ligneous waste by an extractor-crusher which functions to meter the delivery of the waste to the cyclone to which is also fed fumes from the recycling blower. In order to afford a suitable slight excess pressure in the boiler while effecting cooling of the combustion gases fed to the cyclone, an air inlet with an adjustable opening is located upstream of the recycling blower. The boiler is fed both with air and with fuel by a feed blower which supplies ligneous scrap and residue taken from the delivery spout of the cyclone into the firebox of the boiler.

The device for extracting, crushing, and metering chips and other ligneous waste is disposed at the base of a hopper containing the waste and is provided with an extraction arm which cyclically sweeps within the hopper, and a mill comprising knives and counter-knives borne by plates which are stacked vertically and in coaxial relation with respect to each other. The extraction arm is coupled by a universal joint to a driven shaft which operates to rotate some of the knife-holder plates, the rotary movement of the shaft being relatively slow. It is noted that in addition to the advantage of simplicity provided by the use of a single shaft and a single drive motor, the device, due to the slow speed of the knives, makes it possible to divide up very wet ligneous waste.

The arm is provided with a notched crown adjacent its point of articulation on the shaft, and the shaft is provided adjacent the point of articulation with a notched bowl which intermeshes with the crown. As a result of this arrangement, the arm cannot be blocked from rotating in an inclined position within the hopper, for in this position the crown and the bowl are in notched engagement with each other, and the arm, therefore, is driven in circumvolution.

The mill is constituted by a housing having coaxially arranged therein (a) a first plate which is stationary with respect to housing, the first plate being provided with a first plurality of blades, referred to as upper counter-knives; (b) a second plate keyed onto the shaft, the second plate being provided with a second plurality of blades constituting knives having two cutting edges; (c) a third plate which is stationary with respect to the housing, said third plate being provided with a third plurality of blades having the shape of oblong orifices constituting lower counter-knives; and (d) a fourth plate which can be displaced angularly with respect to said third plate, the fourth plate being provided with a plurality of triangular orifices equal to the third plurality. This angular displacement is designed to allow for the relative superimposition of the oblong orifices with respect to the triangular orifices, thereby making possible an adjustment of the cross-section of passage of the chips.

The second, third and fourth plates are stacked in substantially face-to-face relation, a fifth plate keyed onto said shaft being located a predetermined distance below the fourth plate. The fifth plate constitutes a turning bedplate defining the bottom of a chamber in the shape of a cylindrical shell in the side wall of which an outlet orifice is provided. The speed of rotation is preferably on the order of 15 rpm.

Furthermore, the first plurality of blades preferably consists of three blades, each blade being located at the edge of an orifice. The second plurality of blades consists of two blades, each blade having two cutting edges, an upper and a lower one, intended to cooperate in one case with the blades of the first plate and in the other case with the blades of the third plate, respectively. The third plurality of blades or orifice of the third and fourth plates are preferably six in number, respectively.

Moreover, each blade of the second plurality has the cross-section of a concave polygon, two adjacent sides of said concave polygon forming an angle of 90° and constituting the traces of the opposing faces of each of the cutting edges, the trace of the face of the lower cutting edge being definitely larger than that of the face of the upper cutting edge. The other two faces of the cutting edges are preferably substantially parallel. The third plate has the shape of a cup which is open towards the top, the inner space of said cup being intended to house the second plate.

The third plate is provided with peripheral orifices, some of which are axial and of elongated shape and are arranged in the plate, while others are radial and preferably arranged in the side wall of the cup. Finally, the chamber, which has the shape of a cylindrical shell, is divided along a radius by a partition which forms the extension of a conduit connecting the chamber to a suction turbine.

The system also includes a pyrolytic burner which facilitates the combustion of a combustible mixture formed of divided ligneous waste entrained in a stream of air. This burner is provided with an enclosure, known as a pyrolysis chamber, having an inlet opening for mixture and an outlet opening, means for transferring some of the heat of combustion from the outlet opening towards the inlet opening, and means for retarding the advance of the ligneous waste in the chamber.

These transfer means are preferably formed by at least one solid core of substantially elongated shape disposed within said chamber and extending approximately from the inlet opening to the outlet opening, the core being formed of a material, such as metal, which is a good conductor of heat. The retarding means is preferably formed of at least one element in the shape of a grid or screen which partially obstructs the passage of the mixture and defines an upstream portion and a downstream portion within the pyrolysis chamber. The screen-shaped element is also formed of a material which is a good conductor of heat, such as metal.

The core constituting the transfer means and the screen element constituting the retarding means are preferably in good thermal contact. As a consequence of this cooperative relation which gives rise to pyrolysis, the combustion of the ligneous waste can commence upon the entrance of the waste into the pyrolysis chamber. Because of the flow of the materials and the flow of some of the heat of combustion are in opposite directions, the ligneous waste cannot emerge from the pyrolysis chamber without its volume being considerably reduced either by the pyrolysis or by the combustion. Finally, and in order to obtain a better exchange of heat between the gases and the core, the latter presents a zigzag path to the combustible mixture at least in its hottest region, and it is profiled at least in its coldest region in such a manner as to permit a good flow and a good distribution of the combustible mixture.

In accordance with one preferred embodiment of the burner which advantageously combines the two characteristics set forth above—namely, the presence of a solid core of elongated shape and the presence of a grid-shaped element in the pyrolysis chamber—the core is a hollow metallic cylinder, a first end of which, adjacent to the inlet opening of the chamber, is closed. The wall of this cylinder is provided with a plurality of perforations, causing the exterior of the cylinder to communicate with its interior.

In this preferred embodiment of the pyrolysis chamber, the outlet opening is of circular shape to permit the fitting therein, preferably in hermetic manner, of the second end of the cylinder. As a result of this arrangement, the passage of the fuel mixture formed of the air and the ligneous waste takes place from the inlet opening towards the outlet opening through the wall of the cylinder. This arrangement not only creates a zigzag path conducive to heat exchange, but it also prevents the passage of non-pyrolyzed waste. Finally, it gives rise to a situation in which the hottest portion of the burning mixture is located in the interior of the core, thereby avoiding undesirable heating of the wall of the chamber.

Preferably, in order to avoid an undesirable overheating of the core that may lead to the formation therein of vitreous residues that block the perforation, the cylindrical core is provided with cooling means formed of a plurality of longitudinal channels formed in the wall of the cylinder, these channels being designed to allow the passage of secondary combustion air and cooling air for the cylinder.

These channels preferably contain a metal helix to promote the exhange of heat between the secondary air and the cylinder. In accordance with this preferred embodiment, the first end of the cylinder is formed of a solid metal disk having its annular groove to connect the channels together and to place them in proper operative relationship with a secondary air inlet conduit.

In accordance with a first modification of this burner, the secondary air which arrives at the front end of the cylindrical core is divided into two streams—a first stream which passes through an annular space provided between the front end of the cylindrical core and a nozzle forming an extension of the core into the firebox, and a second stream of air for cooling the core which passes through the channels from the front towards the rear of said core in a direction of propagation opposition to that of the combustion mixture.

The secondary air which served to cool the core is evacuated from the closure disk via a stack passing through the pyrolysis chamber towards the outside of the burner. This arrangement results in a situation in which the transfer of heat from the hot front end of the core towards its colder rear end is no longer effected solely by conduction but also takes place by reason of convection, thereby giving rise to a more effective transfer and more uniform core temperature.

In accordance with a second modification of the burner, the closure disk is recessed to permit the introduction of at least one solid metal member of elongated shape extending within the hollow metal cylinder and projecting from the disk beyond the cylinder on the side of the inlet opening of said chamber. This member is preferably flanged onto the disk via an insulating refractory gasket, a certain play being provided between the closure disk and the member so as to avoid transfer of heat between the member and the disk. The member serves to recover some of the heat produced within the cylinder and to transfer it to the vicinity of the inlet opening in order to initiate at this point the pyrolysis of the waste.

OUTLINE OF DRAWINGS

For a better understanding of the invention as well as other objects and further features thereof, reference is made to the following detail description to be read in conjunction with the accompanying drawings, wherein:

FIG. 1 schematically shows a system for carrying out a process in accordance with the invention for the combustion of ligneous and other waste material;

FIG. 2 is an elevation of one preferred embodiment of the system shown in FIG. 1;

FIG. 3 illustrates in vertical section, a preferred embodiment of an extractor-crusher metering device usable in a system of the type shown in FIG. 1;

FIG. 4 is a top view, partly in section, showing a detail of the device illustrated in FIG. 3;

FIG. 5 is a plan view of the first knife-holder plate included in the device shown in FIG. 3;

FIG. 6 is a partial section, in an enlarged scale, of one of the knives carried by the first knife-holder plate;

FIG. 7 is a plan view of the second knife-holder plate included in the device shown in FIG. 3;

FIG. 8 is a partial section, in an enlarged scale, of one of the knives carried by the second knife-holder plate;

FIG. 9 is a plan view of the third counter-knife-holder plate included in the device shown in FIG. 31;

FIG. 10 is a plan view of the fourth plate included in the device shown in FIG. 3 which fourth plate cooperates with the third plate;

FIG. 13 is a longitudinal section taken through a first modification of the pyrolytic burner;

FIG. 14 is a longitudinal section taken through a second modification of the pyrolytic burner, and FIG. 15 is an end view of the core of the burner shown in FIG. 14.

DESCRIPTION OF INVENTION

Figure 11:
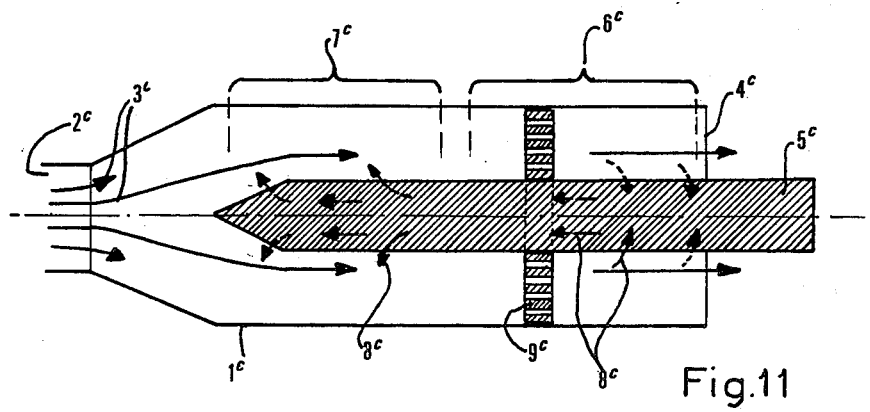
FIG. 11 illustrates a first embodiment of a pyrolytic burner according to the invention.

The Basic System:

FIG. 1 illustrates an arrangement in accordance with the invention in which ligneous waste stored in a hopper or bin $2^a$ and "fumes" emerging from a boiler $3^a$ are introduced into the enclosure $1^a$ of an "exchanger-separator." Hot moisture-laden gases are exhausted from this enclosure via a chimney or stack $4^a$, while solid particles are withdrawn from it by a delivery spout $5^a$.

In FIG. 2, the exchanger-separator $1^a$ of FIG. 1 assumes the cylindrical-conical shape of a cyclone $14^a$ provided with two tangential inlets $26^a$ and $27^a$ at its upper end and two axial outlets, namely a lower outlet $21^a$ forming a delivery spout and an upper outlet $19^a$ constituting a stack. The two inlets $26^a$ and $27^a$ are diametrically opposed to each other since the installation is on a straight line. Inlet $26^a$ is coupled via a conduit $15^a$ to an extraction blower $16^a$ that is supplied with ligneous waste by a crusher-extractor $11^a$ which derives the waste from a storage bin $10^a$. Upper inlet $27^a$ is coupled via a conduit $17^a$ to a recycling blower $18^a$.

Recycling blower $18^a$ is coupled to the smokebox $29^a$ of a boiler $12^a$ whose inlet $23^a$ has an opening which is adjustable by means of a damper $24^a$ to permit the smokebox to be placed in communication with the atmosphere. A second damper $25^a$ acts to regulate the flow of the fumes between smokebox $29^a$ and recycling blower $18^a$.

A feed blower $22^a$ charges the firebox $13^a$ of the boiler $12^a$ with ligneous waste and residue collected at the delivery spout $21^a$ of the cyclone intermingled with combustion air. Due to the action of extraction blower $16^a$ and recycling blower $18^a$ which charge the cyclone, the cyclone is under a slight excess pressure; hence gases laden with moisture can be evacuated through stack $19^a$, after having been subjected to dust removal in a filter, such as the static filter $30^a$, while the solid particles are collected at the base or delivery spout of the cyclone. By way of illustration, for an installation of average power, the excess pressure in cyclone $14^a$ is 200 mm water column and the fumes arriving at the cyclone through conduit $17^a$ have a temperature of between 80° and 250° C.

Due to the action of feed blower $22^a$ and dampers $23^a$ and $25^a$, boiler $12^a$ can be maintained under a slight excess pressure—for instance, of 30 to 60 mm water column. By way of illustration, the moisture of the ligneous waste may drop from 80% to 10%.

Crusher-Extractor:

In FIGS. 3 and 4, there is shown a crusher-extractor in accordance with the invention, which is designed for attachment to the base of a hopper $1^b$. This device comprises an extraction arm $2^b$ supported and caused to cyclically sweep along the hopper by a motor-driven shaft $3^b$ which also drives a mill constituted by a plurality of circular plates arranged within a cylindrical housing $4^b$. Shaft $3^b$ is rotated by a motor/speed-reducer unit $5^b$ coupled to the drive motor. A crusher of this type may constitute element $11^a$ in the system shown in FIG. 2.

In accordance with one feature of the invention, arm $2^b$ in the vicinity of the universal joint $6^b$ which joins the arm to shaft $3^b$ is provided with a notched crown $7^b$, while the shaft $3^b$ near the joint of the arm has a notched bowl $8^b$ which intermeshes with crown $7^b$. The number of notches on crown $7^b$ is preferably six, and that of the bowl, three. Thus as the shaft is rotated, the arm which is at an inclined position is caused to revolve within the hopper.

The mill contained in housing $4^b$ comprises, in a coaxial arrangement from top to bottom, a first stationary counter-knife-holder plate $10^b$ secured to housing $4^b$, a second knife-holder plate $11^b$ secured to shaft $3^b$ and rotating therewith, a third counter-knife-holder plate $12^b$ which is stationary and secured to housing $4^b$, a fourth metering-orifice plate $13^b$ which is stationary and secured to housing $4^b$ and a fifth plate $14^b$ secured to shaft $3^b$ and constituting a rotating bedplate.

Plate $14^b$ is arranged at a predetermined distance below plate $13^b$ so as to define a chamber having the shape of a cylindrical shell $15^b$ of which it constitutes the bottom. The side wall of housing $4^b$ is provided with an orifice $16^b$ to discharge the waste which is directed towards a turbine $17^b$ via a conduit $18^b$.

As best seen in FIG. 4, a partition $19^b$ divides shell chamber $15^b$ along a radius, the partition being extended into conduit $18^b$ which it divides into two separate compartments $20^b$ and $21^b$. Compartment $20^b$ is in communication with the atmosphere, while compartment $21^b$ forms the inlet into turbine $17^b$. Thus when the installation is in operating condition, air arriving through compartment $20^b$ is drawn into chamber $15^b$, the air circulating about shaft $3^b$ acting to entrain the crushed waste passing through compartment $21^b$ towards turbine $17^b$.

FIGS. 5 and 6 show the counter-knife-holder plate $10^b$, the plate being provided with a first plurality of three blades, such as blade $23^b$. Each of these blades $23^b$ is located at the edge of an orifice such as $24^b$, the blades being inclined with respect to the axis of plate $10^b$.

FIG. 7 shows the second plate $11^b$, this being provided with a second plurality of two blades, such as $41^b$, constituting knives with two cutting edges. The shape of these blades is more readily visible in the sectional view of FIG. 8 where it will be seen that blade $41^b$ has a section in the shape of a concave polygon, two adjacent sides $43^b$ and $44^b$ of this polygon forming an angle of 90° and constituting the traces of the opposite faces of each of the cutting edges. The two other faces $45^b$ and $46^b$ are substantially parallel to each other. It will be noted that face $44^b$ of the lower cutting edge is definitely larger than face $43^b$ of the upper cutting edge.

In FIG. 9, the third plate $12^b$, which has the shape of a cup, is provided with a third plurality of six blades, such as blade $61^b$, in the form of oblong orifices constituting lower counter-knives intended to cooperate with the lower cutting edges ($44^b$, $46^b$) of a knife $41^b$ of plate $11^b$. Due to its cup shape, plate $12^b$ can receive plate $11^b$ concentrically, and it is provided with axial peripheral orifices of elongated shape such as $62^b$, and radial orifices such as $63^b$. These orifices are intended for the evacuation of the fine ligneous dusts which tend to accumulate between plates $11^b$ and $12^b$ and to interfere with the rotation of plate $11^b$. For this purpose, thin metallic tongues ($47^b$, FIG. 7) can be inserted on the lower face of plate $11^b$ so as to force the dust towards orifices $62^b$ and $63^b$.

FIG. 10 shows the fourth plate $13^b$ which is provided with a plurality of six triangular orifices such as $71^b$, in registration with orifices $61^b$ of plate $12^b$. Plate $13^b$ is angularly displaceable with respect to plate $12^b$ so that the orifice common to an orifice $61^b$ and an orifice $71^b$ is adjustable, thus permitting adjustment of the cross-section of the passage for the crushed waste and hence the quantity thereof.

Pyrolysis Chamber:

FIG. 11 shows a pyrolysis chamber $1^c$ which has a substantially elongated nozzle-like shape to receive at its inlet end $2^c$ a combustible mixture formed of divided ligneous waste entrained in a stream of air (solid-line arrows $3^c$) and to direct this mixture towards its outlet end $4^c$. A solid core $5^c$ of substantially elongated shape is formed of a material which is a good conductor of heat, such as metal, and is coaxially arranged within the pyrolysis chamber. Core $5^c$ is designed to transfer a portion of the heat of combustion of the waste from a hot zone $6^c$ adjacent the outlet end towards a colder zone $7^c$ adjacent the inlet end. This transfer of the heat which takes place by conduction in the core is represented by the dashed-line arrows $8^c$.

At least one grid-like element, such as $9^c$, which is preferably also solid and has a grid or screen formation, is arranged in the path of the combustible fuel mixture to separate the pyrolysis chamber into an upstream section and a downstream section with respect to the flow path. Grid element $9^c$ functions to retain ligneous waste which has not undergone pyrolysis and/or partial combustion. Grid element $9^c$ is preferably in good thermal contact relationship with core $5^c$ and may be integral with it. Thus, due to the opposite directions of flow of the fuel mixture ($3^c$) and of the heat ($8^c$), pyrolysis of the ligneous waste takes place in the vicinity of the inlet to the chamber and combustion is substantially complete at the outlet.

The end of the solid core $5^c$ closest to the inlet opening of the pyrolysis chamber is advantageously shaped in such a manner as to foster a good flow and a good distribution of the combustible mixture in the chamber. The rear portion of core $5^c$ can, in practice, be advantageously shaped in such a manner as to offer a zigzag path to the combustible mixture in order to enhance the heat exchange. Such a pyrolysis chamber or firebox may advantageously constitute the firebox $13^a$ in the system shown in FIG. 2.

Figure 12:
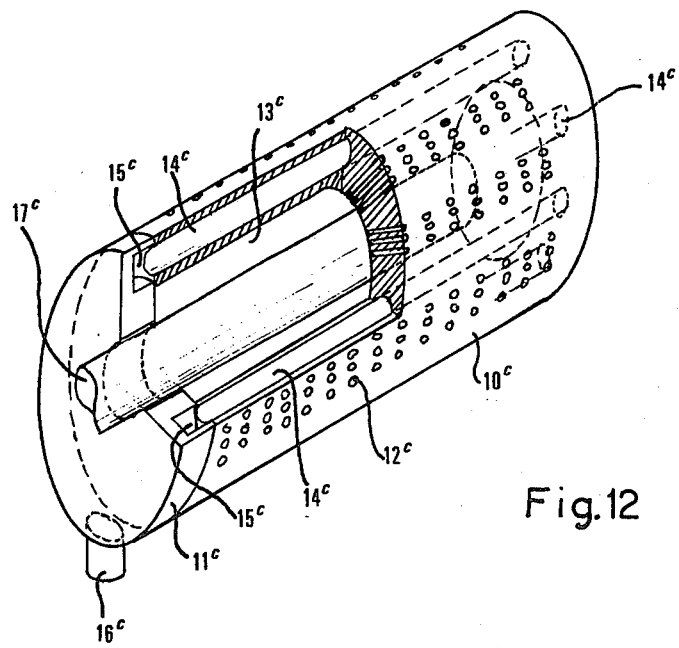
FIG. 12 is a perspective view, partly in section, of a preferred form of core for a pyrolytic burner of the type shown in FIG. 11.

Pyrolysis Chamber Core:

FIG. 12 shows a particularly advantageous embodiment of a core for a pyrolysis chamber of the type shown in FIG. 11. The core shown in this figure consists of a hollow cylinder $10^c$ closed at one of its ends by a disk $11^c$. The wall of cylinder $10^c$ is provided with a plurality of perforations, such as $12^c$, which connect the exterior of the cylinder with its interior $13^c$.

This configuration of the core as a hollow cylinder with a perforated wall has two advantages. First, it forms the zigzag shape of the path of the fuel mixture and permits an excellent heat exchange between the flames and the core. Second, the hottest portion of the flames lies in the interior of the cylinder, while the coldest portion is on the exterior thereof; hence, the wall of the pyrolysis chamber which contains the cylinder remains at a relatively low temperature. This has advantages in that the corrosion thereof is reduced and a minimum amount of heat is lost through the wall.

Another feature characteristic of the core shown in FIG. 12 resides in a plurality of longitudinal channels, such as $14^c$, provided in the body of the wall of cylinder $10^c$. These channels are connected via a groove $15^c$ formed in end disk $11^c$ to an air inlet conduit $16^c$. This air serves both for the cooling of core $10^c$ and, as will be explained further below, as secondary combustion air.

Experience has shown that it is necessary for the temperature of this core not to exceed 800° C.; for if it does, one runs the risk of forming vitreous residues derived from the combustion ashes and hence the risk of obstructing the perforations and decreasing the heat exchange. In FIG. 12, a solid element $17^c$ is housed within hollow cylinder $10^c$, this element projecting through an orifice in disk $11^c$ to emerge outside of the hollow cylinder on the inlet side of the combustible mixture. It is to be noted that element $17^c$ is optional, but it is useful in certain cases in order to improve the heat transfer from the hot parts towards the colder parts.

First Modified Burner:

In FIG. 13, there is shown a first modification of a pyrolytic burner in accordance with the invention. A stream of secondary air $18^c$ arrives at the front end of the cylindrical core $19^c$ and is divided into two streams: a first stream $20^c$ and a second stream $23^c$. First stream $20^c$ passes into an annular space $21^c$ between the front end of the solid core $19^c$ and a nozzle $22^c$ which is shaped as a Venturi tube and forming an extension of the core leading into the firebox of the boiler, and a second stream $23^c$. Second stream $23^c$ passes through longitudinal channels $24^c$ provided in core $19^c$ from the front to the rear of the core along a direction of propagation opposite to that of the combustion mixture (arrows $25^c$) formed of the air and the ligneous waste.

The secondary cooling air $23^c$ is collected by a closure disk $26^c$ to be evacuated via a stack $27^c$ coupling pyrolysis chamber $28^c$ to the outside of the burner. Pyrolysis chamber $28^c$ is advantageously a substantially cubic enclosure provided on its side faces with access doors such as $29^c$ permitting the inspection and cleaning of the perforations of the solid core.

The introduction of secondary combustion air and of the secondary cooling air for the core also advantageously is effected via two annular conduits $30^c$ and $31^c$, respectively, which open onto a portion of a base of the burner forming a secondary air inlet conduit, while another portion of the base into which stack $20^c$ opens, forms a discharge box for the cooling air after its passage through the channels. Dampers $41^c$ and $42^c$ make it possible to regulate the amounts of secondary air assigned, respectively, to combustion and cooling. Finally, nozzle $22^c$ is advantageously provided with a refractory lining on its inner side.

This embodiment permits operation of the pyrolytic burner at a relatively low temperature (by way of illustration about 300° C. in the core and 100° C. in the enclosure). The importance of such operation at relatively low temperature resides in the absence of any risk of fusion of the ash on the core and in the minimized physical chemical attack of the component parts of the burner and in particular of the core.

Second Modified Burner:

In FIGS. 14 and 15, another modified form of a pyrolysis burner in accordance with the invention comprises primarily a pyrolysis chamber $32^c$ provided with an asymmetrical inlet opening $33^c$, an outlet opening $34^c$ and a hollow cylindrical core $35^c$ having a solid inner plug $36^c$ whose head is profiled in the shape of an ogive.

Plug $36^c$ is flanged via a refractory insulating gasket $37^c$ onto a grooved closure disk $38^c$ which is recessed in its center. Core $35^c$ includes, as in the preceding embodiment, a plurality of radial perforations such as $39^c$, and longitudinal channels such as $40^c$, for instance, eight channels. The asymmetrical shape of the inlet opening $33^c$ takes into account—in the case of this illustrative embodiment—a strong granulometry of the ligneous waste.

The burners of FIGS. 12 and 13 are designed to be housed in the circular mouth of a boiler which may advantageously be a high-pressure boiler. These burners are fed continuously with air and ligneous waste by devices which are already known and do not fall within the scope of the present invention. They can be placed in operation by the temporary injection of a readily inflammable fluid fuel by means of an injector such as injector $31^c$ of FIG. 13. These burners can operate just as well and for prolonged periods by means of a fluid fuel such as petroleum when there is a lack of ligneous waste. Optimum operation of these burners can be realized by creating a bed of glowing embers in the lower portion of the pyrolysis enclosure by a suitable adjustment of the rate of flow and of the proportions of the fuel mixture.

The burners in accordance with the invention can also serve as a gas generator by removing the partially-burned gases either within the hollow cylinder in front of the entrance of the secondary air via the channels or by means of a strainer arranged in the lower portion in the pyrolysis enclosure, the partially-burned gases then being capable of serving to feed combustion engines.

It is to be understood that the invention can be applied to all materials which are capable of being divided or disintegrated and of producing combustible gases by the action of pyrolysis. This is true, in particular, of certain compacted materials from household garbage, which is rich in carbon.

While there have been shown and described preferred embodiments of a system for the pyrolytic combustion of ligneous and other wastes in accordance with the invention, it will be appreciated that many changes and modifications may be made therein without, however, departing from the essential spirit thereof.

I claim:

1. A system provided with a pyrolytic burner cooperating with a boiler for effecting the combustion of a mixture of divided waste such as ligneous waste entrained in a stream of air to produce heat, said burner comprising:

A. an enclosure defining a pyrolysis chamber having inlet and outlet openings, the mixture being blown into the inlet opening and being advanced in said chamber in a flow path from the inlet to the outlet opening;

B. a metal thermally-conductive core having an elongated form disposed in said enclosure and extending substantially from the inlet to the outlet opening thereof to transfer some of the heat of combustion from the outlet opening to the inlet opening; and C. means to retard the advance of said mixture in said chamber, said means being constituted by a metallic element having pores therein to define a grid or screen-like structure which divides the chamber into an upstream section and a downstream section with respect to said flow path, the transfer of heat by the core being in a direction opposed to the flow path direction whereby pyrolysis of the mixture takes place in the vicinity of the inlet opening and combustion is substantially complete at the outlet opening.

2. A system as set forth in claim 1, wherein said core is constituted by a hollow metal cylinder whose wall is perforated to connect the exterior of the cylinder with the interior thereof, one end of said cylinder being closed, the outlet opening of said chamber having a circular shape to accommodate the other end of said cylinder.

3. A system as set forth in claim 2, wherein the wall of said cylinder has a plurality of longitudinal channels formed therein and coupled to an external secondary air inlet to provide passages for the flow of secondary combustion and cooling air for the cylinder.

4. A system as set forth in claim 3 wherein said one end of said cylinder is closed by a solid metal disk having an annular groove for interconnecting said channels and placing them in operative relation with said secondary air inlet.

5. A system as set forth in claim 4, further including means causing said secondary air arriving at the front end of said cylinder to be divided into two streams, one stream passing into an annular space defined between the front end of the cylinder and a nozzle which extends said core into the firebox of the boiler, the other stream of air for the cooling of the cylinder passing through said channels from the front to the rear of cylinder in a direction of propagation opposed to that of said mixture, the secondary air which has served to cool the cylinder being evacuated behind the closure disk via a stack passing through the pyrolysis chamber towards the outside of the burner.

6. A system as set forth in claim 5, further including at least one elongated metal element arranged within said hollow metal cylinder and extending outside of said cylinder on the inlet opening side of said chamber, said element serving to recover a portion of the heat of combustion produced within said cylinder and to transfer it to the vicinity of the inlet opening in order to initiate the pyrolysis of the said waste at this side.

7. A system as set forth in claim 6, wherein said element projects through said closure disk on which it is flanged via an insulating refractory gasket, clearance being provided between said closure disk and said element so as to avoid a transfer of heat.

8. A system as set forth in claim 1, further including an exchanger-separator for drying the waste fed into the pyrolytic burner, said exchanger-separator comprising an enclosure into which are supplied ligneous waste entrained in a stream of air and the hot fumes coming from the boiler to be intimately mixed therein, from which exchanger-separator, gases laden with moisture and dried ligneous waste are removed in separate outlets.

9. A system as set forth in claim 8 wherein said exchanger-separator enclosure is shaped and includes means to effect a turbulent movement of the ligneous waste and of the fumes.

10. A system as set forth in claim 9, wherein said enclosure is a cylindrical-conical enclosure of the "cyclone" type having at least one tangential inlet and two axial upper and lower outlets.

11. A system as set forth in claim 10, wherein said enclosure has two tangential co-linear inlets, one inlet being fed by an extraction blower which passes the stream of air entraining said waste into the cyclone while the other inlet is fed by a recycling blower which supplies said fumes into the cyclone, said upper outlet constituting a stack for the evacuation of the moisture laden gases to the atmosphere, the lower outlet constituting a delivery spout for dried waste.

12. A system as set forth in claim 11, wherein said extraction blower is supplied with ligneous waste by an extractor-crusher which has a metering function, and the recycling blower is in communication with the smokebox of said boiler, further including an air inlet with an adjustable opening located upstream of the said recycling blower.

13. A system as set forth in claim 8, wherein said extractor-crusher includes a hopper to receive fresh waste, a revolving extraction arm which is caused to sweep said hopper, and a mill having knives and counter-knives borne by vertically-stacked plates which are in axial relation to each other, the extraction arm being supported and caused to rotate by a shaft which is coupled to certain of the knife-holder plates and is driven to rotate said plates at a relatively slow speed, said shaft being coupled to the arm by a universal joint, said arm having in the vicinity of said joint a notched crown, said shaft having in the vicinity of said joint a notched cup which intermeshes with said crown whereby rotation of said shaft causes the arm to revolve.

14. A system as set forth in claim 13, wherein said mill comprises a housing having arranged coaxially therein from top to bottom:
(a) a first plate which is fixed with respect to the said housing, the said first plate being provided with a first plurality of upper counter-knife blades,
(b) a second plate keyed to said shaft, said second plate being provided with a second plurality of blades constituting knives with two cutting edges,
(c) a third plate which is fixed with respect to said housing, said third plate being provided with a third plurality of blades in the form of oblong orifices constituting lower counter knives,
(d) a fourth plate displaceable angularly with respect to said third plate, said fourth plate being provided with a plurality of triangular orifices equal to said third plurality; the angular displacement being such as to superimpose the said oblong orifices to a greater or lesser extent on the said triangular orifices and thus permit an adjustment of the cross sectional area of the passage of the chips, said first, second, third and fourth plates being stacked substantially in face to face relation, and
(e) a fifth plate keyed onto said shaft and located a predetermined distance below said fourth plate, said fifth plate constituting a turning bedplate which defines the bottom of a chamber in the shape of a cylindrical shell in the side wall of which an outlet orifice is provided.

15. A system as set forth in claim 14, wherein the speed of rotation of the shaft is in the order of 15 rpm, said first plurality of blades consisting of three blades each of which is located at the edge of an orifice, said second plurality of blades consisting of two plates each having upper and lower cutting edges, one edge cooperating with the blades of the first plate and the other edge with the blades of the third plate, respectively, said third pluralities of blades or orifices of the third and fourth plates respectively being six in number.

16. A system as set forth in claim 15, wherein each blade of said second plurality has the section of a concave polygon, two adjacent sides of said concave polygon forming an angle of 90° and constituting the traces of the opposing faces of each of the cutting edges, the trace of the face of the lower cutting edge being definitely larger than that of the face of the upper cutting edge, the two other faces of the cutting edges being substantially parallel.

17. A system as set forth in claim 16, wherein said third plate has the shape of a cup which is open towards the top, the inner space of said cup being adapted to contain said second plate, said third plate being provided with peripheral orifices, some being axial and of elongated shape and being formed in the plate, the others being radial and being formed in the side wall of the cup.

18. A system as set forth in claim 17, wherein the chamber having the shape of a cylindrical shell is divided along a radius by a partition which extends into a conduit connecting said chamber to a suction turbine.

* * * * *